United States Patent
Morrissey et al.

(10) Patent No.: US 6,776,386 B1
(45) Date of Patent: Aug. 17, 2004

(54) LID FOR EXOTHERMIC REACTION WELDING MOLD

(75) Inventors: William Morrissey, Tulsa, OK (US); Brian E. Davidson, Broken Arrow, OK (US); Dan Wilson, Tulsa, OK (US)

(73) Assignee: Continental Industries, Inc., Tulsa, OK (US)

( * ) Notice: Subject to any disclaimer, the term of this patent is extended or adjusted under 35 U.S.C. 154(b) by 90 days.

(21) Appl. No.: 10/103,332

(22) Filed: Mar. 21, 2002

(51) Int. Cl.[7] ............................................. B23K 23/00
(52) U.S. Cl. ..................... 249/97; 249/86; 249/170; 249/205; 164/54; 228/234.3
(58) Field of Search ........................... 249/86, 97, 105, 249/170, 205; 425/812; 164/54; 228/254.3

(56) References Cited

U.S. PATENT DOCUMENTS

| | | |
|---|---|---|
| 1,607,508 A | 11/1926 | Bottrill |
| 2,870,499 A * | 1/1959 | Burke ........................ 164/54 |
| 3,004,310 A | 10/1961 | Burke ........................ 22/116 |
| 3,022,554 A | 2/1962 | Burke ........................ 22/116 |
| 3,113,359 A | 12/1963 | Burke ........................ 22/116 |
| 3,234,603 A | 2/1966 | Leuthy et al. ................ 22/58 |
| 3,255,498 A | 6/1966 | Leuthy et al. ................ 22/58 |
| 5,145,106 A | 9/1992 | Moore et al. .............. 228/241 |
| 5,533,662 A | 7/1996 | Stidham et al. ............. 228/33 |
| 5,582,228 A | 12/1996 | Stidham et al. .............. 164/54 |
| 5,653,279 A * | 8/1997 | Foutz et al. .................. 164/54 |
| 5,660,317 A | 8/1997 | Singer et al. ............. 228/44.3 |
| 5,715,886 A | 2/1998 | Fuchs .......................... 164/54 |
| 5,829,510 A | 11/1998 | Fuchs .......................... 164/54 |
| 5,954,261 A | 9/1999 | Gaman ....................... 228/33 |
| 6,382,496 B1 * | 5/2002 | Harger .................... 228/44.3 |

* cited by examiner

Primary Examiner—James P. Mackey
Assistant Examiner—Donald Heckenberg
(74) Attorney, Agent, or Firm—Head, Johnson & Kachigian

(57) ABSTRACT

A lid for an exothermic reaction mold device. The device includes an internal crucible in a block with an open top. The lid includes a lower face with an elongated opening therethrough. The lid also includes an upper face with a circular opening therethrough whereby an axis of the circular opening passes through the elongated opening. A space between the upper face and the lower face of the lid is vented through a vent between the upper and the lower face.

14 Claims, 3 Drawing Sheets

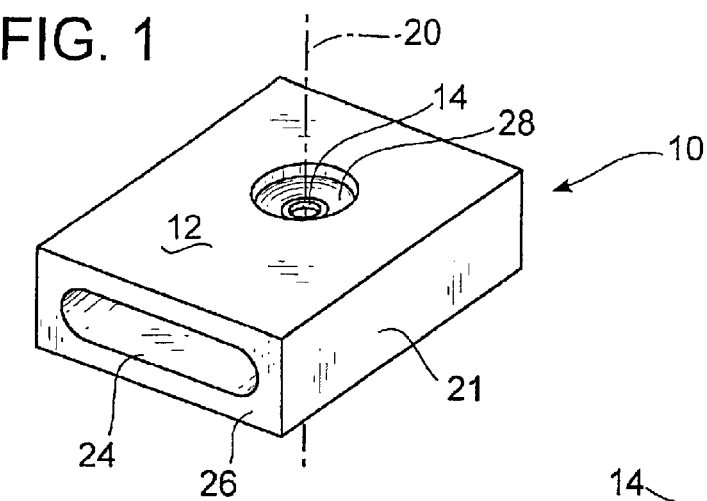
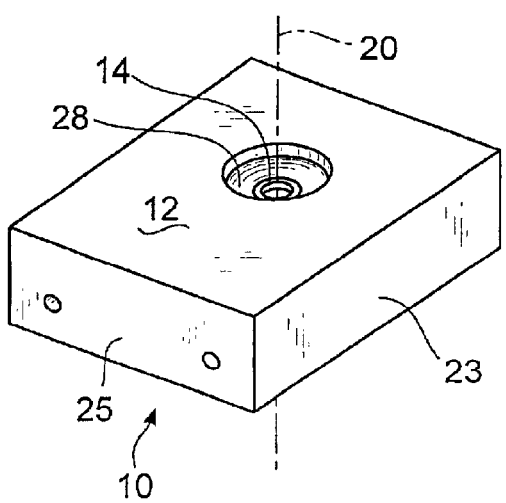
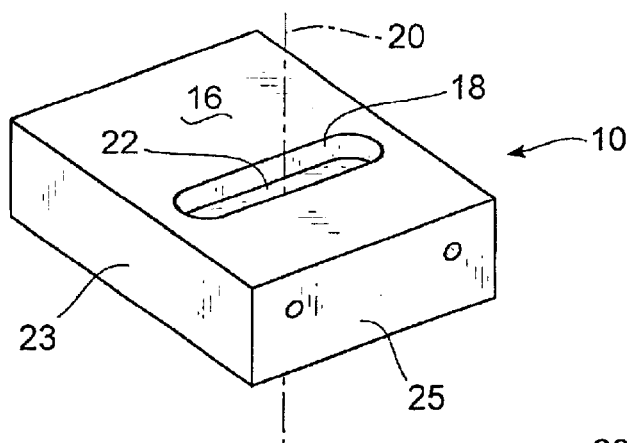
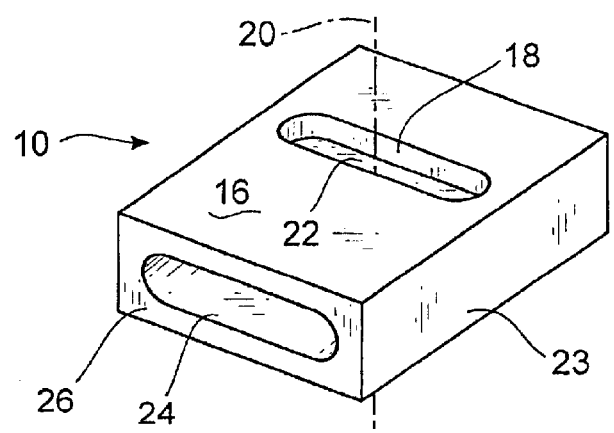

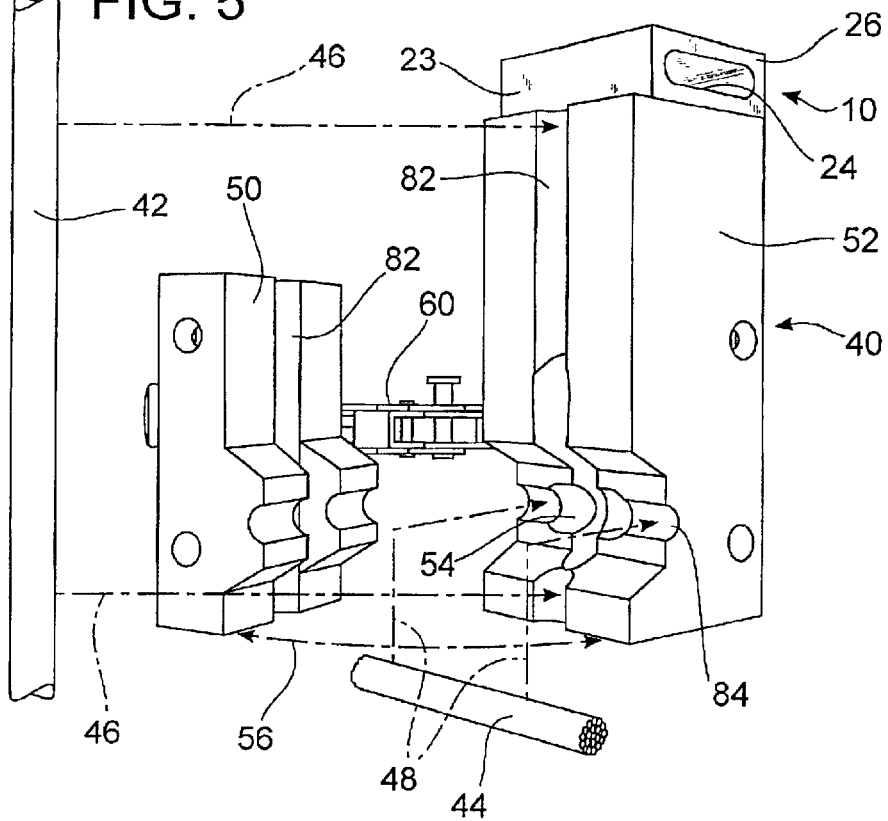
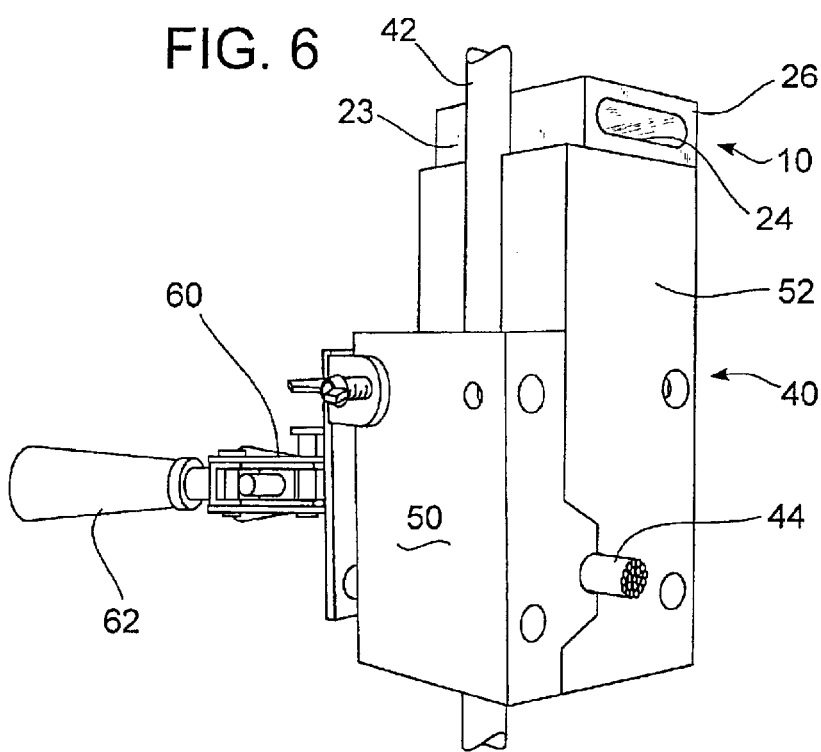

LID FOR EXOTHERMIC REACTION WELDING MOLD

BACKGROUND OF THE INVENTION

1. Field of the Invention

The present invention is directed to a lid for an exothermic reaction mold device. In particular, the present invention is directed to a lid for an exothermic reaction mold device having a top opening for ignition and a front or side vent for releasing products of combustion.

2. Prior Art

Exothermic reaction welding is a known procedure for joining connectors such as, but not limited to, stranded metal cable to each other and also to ground rods and other parts. A wide variety of connectors may be made, such as, but not limited to, copper-to-copper or copper-to-steel. In the known exothermic reaction welding procedures, a mold, which may be composed of graphite, ceramic or other refractory material, contains an internal crucible into which a powder material is placed. At the bottom of the internal crucible is a shoulder which forms a seat for a metal retainer disk which supports the exothermic powder material.

The powder material may be composed of metal oxide such as tin oxide fines or copper or iron oxide fines. In one known procedure, the reduction of copper oxides is performed by aluminum which produces molten copper and aluminum oxide slag. When the powder is ignited, an exothermic reaction results in the crucible. The powder liquifies and the molten material melts the small steel or metal disk which is initially placed at the bottom of the crucible, thus permitting the molten metal to flow through a tap hole or passageway into a weld cavity. The molten copper is denser than the slag and separates from the slag and flows to the bottom of the cavity.

A hinged lid is not required for the exothermic reaction but is often utilized to contain the reaction. The lid will permit escape of gases produced during the exothermic reaction without danger of having the gases, flames or particles projecting outward.

Often times a portion of the powder material or a separate starting powder material will be sprinkled near an opening.

A spark or ignition gun is often used to start the exothermic reaction, since the exothermic reaction takes place extremely quickly once ignited. It is desirable to protect the spark or ignition gun for the projecting gases and flames to promote longevity of the spark or ignition gun.

Often, the weld will be made in the field in small, confined spaces such as a trench. It is also desirable to provide a lid and exothermic reaction lid which may be ignited from the top rather than the side for use in small, confined spaces.

Various other types of covers or lids have been proposed in the past. Moore et. al. (U.S. Pat. No. 5,145,106) discloses a hinged cover 42 which may include a two part filter system 43 to resist molten metal splatter from the exothermic reaction. Fuchs (U.S. Pat. No. 5,829,510) discloses an alternate lid design.

There remains a need for a lid for an exothermic reaction welding mold device which will promote the life of the mold and promote ease of lighting or ignition.

There remains a need for a lid for an exothermic reaction welding device which reduces weld splatter, including splatter on mold handles.

In addition, there remains a need for an exothermic reaction mold device which promotes the life of the spark or ignition gun.

SUMMARY OF THE INVENTION

The present invention is directed to a lid for an exothermic reaction mold device. The lid includes an upper or top face with an opening therethrough. The lid also includes a bottom or lower face with an opening therethrough. The top face and the lower face are joined by side faces with the upper face being parallel to the lower face. The opening through the upper or to face has an axis which passes through the opening of the lower face. In one embodiment, the lid is perpendicular to the axis of the circular opening.

A space between the upper face and the lower face of the lid forms a pocket in communication with both the circular opening of the top face and the elongated opening of the bottom face. The space is vented through a vent in one of the side faces. Accordingly, the vent forms a pocket which is recessed from a side face of the lid.

This invention will increase ease of ignition, prolong flint gun life, and reduce weld splatter coming from the crucible which will, in turn, increase the life of mold handles.

BRIEF DESCRIPTION OF THE DRAWINGS

FIG. 1 is a perspective view of a lid for an exothermic reaction welding mold constructed in accordance with the present invention;

FIG. 2 is an alternate perspective view of a lid for an exothermic reaction welding mold as shown in FIG. 1;

FIG. 3 is an alternate perspective view of a lid for an exothermic reaction welding mold as shown in FIG. 1;

FIG. 4 is an alternate perspective view of a lid for an exothermic reaction welding mold as shown in FIG. 1;

FIG. 5 is an exploded view of a lid and one type of exothermic reaction welding mold with a connector rod and stranded cable exploded therefrom;

FIG. 6 is a perspective view of the lid and exothermic reaction welding mold as shown in FIG. 5 in a closed position;

DETAILED DESCRIPTION OF THE PREFERRED EMBODIMENTS

Figure 7:
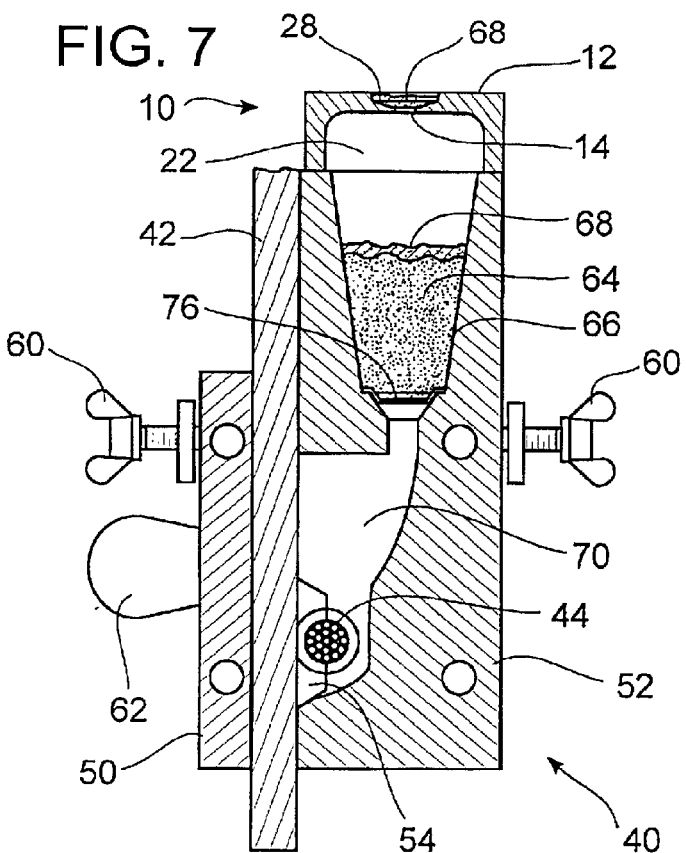
FIG. 7 is a cross-sectional view of the lid and exothermic reaction welding mold shown in FIG. 6.

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Referring to the drawings in detail, FIGS. 1 and 2 illustrate alternate perspective views of a lid 10 for an exothermic reaction mold. FIGS. 3 and 4 illustrate the lid 10 in further alternate perspective views.

The lid 10 includes an upper or top face 12 with a circular opening 14 therethrough. With reference to FIGS. 3 and 4 and continuing reference to FIGS. 1 and 2, the lid 10 also includes a bottom or lower face 16 with an elongated opening 18 therethrough. In the present embodiment, the upper face is parallel to the lower face. The elongated opening 18 may be oval, elliptical or take other shapes. The circular opening 14 through the upper or top face 12 has an axis 20 which passes through the elongated opening 18.

Extending between the top face 12 and the lower face 16 are side faces 21, 23, 25 and 26.

A space 22 between the upper face 12 and the lower face 16 is provided. The space forms a pocket which is in communication with both the circular opening of the top face and the elongated opening of the bottom. The space 22 is vented through a vent 24 (seen in FIGS. 1 and 4). Accordingly, the vent 24 forms a pocket which is recessed from a side face 26 of the lid 10.

In the present embodiment, the vent 24 is perpendicular to the axis 20 of the circular opening.

Returning to a consideration of FIGS. 1 and 2, the circular opening 14 also includes an optional counter sunk funnel top in the upper or top face 12. The optional counter sunk top forms a receptacle for the starting powder to be used (not shown in FIGS. 1 through 4).

As will be seen herein, the bottom or lower face 16 completely covers the block when in a closed position.

The lid 10 may be composed of graphite or other material. The lid may be produced by machining from a single block or may be formed in other manners within the teachings of the present invention.

FIGS. 5 and 6 illustrate the lid 10 of the present invention in use with one type of exothermic reaction mold device 40. It will be understood that the lid 10 of the present invention may be employed on a wide variety of exothermic reaction mold devices within the teachings of the present invention. FIG. 5 illustrates an exploded view of the mold device 40 while FIG. 6 illustrates a view of the mold device 40 in a closed position. In the particular embodiment illustrated, a ground or conductor rod 42 will be connected to a stranded cable 44. Arrows 46 and 48 illustrate the position of the conductor rods 42 and stranded cable 44, respectively. A male portion 50 of the mold joins with a female portion of the mold 52 to hold the conductor rod 42 and stranded cable in place.

Arrow 56 illustrates the movement between open and closed positions.

It will be understood that various types of connectors, such as stranded cable to stranded cable, may be made while employing the lid of the present invention.

As best seen in FIG. 5, a mold cavity 54 will receive molten material which flows from the exothermic reaction in the crucible.

Clamps 60 retain the male portion 50 and female portion 52 in position so that they may move between the closed position for use as seen in FIG. 6 and the open position for installation and cleaning as seen in FIG. 5. Clamps 60 may also include handles 62 for use by an operator.

The ground rod 42 will be within ground rod passage 82 while the stranded cable 44 will be within wire passage 84.

Figure 8:
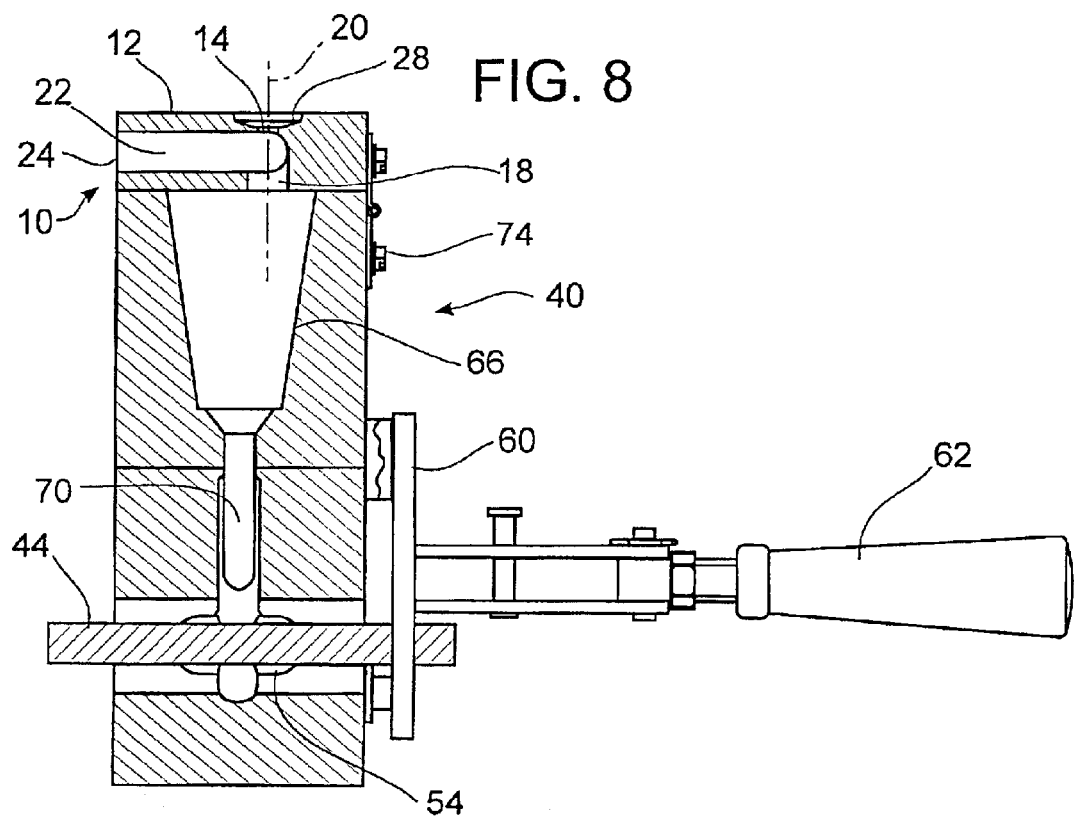
FIG. 8 is an alternate sectional view of the lid and exothermic reaction welding mold shown in FIG. 6.

FIGS. 7 and 8 illustrate sectional views of the lid 10 and the mold device 40. FIG. 7 illustrates the mold device 40 with metal oxide powder 64 in a crucible 66. A portion of the metal oxide 66 or a separate starting powder 68 is sprinkled into the funnel top of the circular opening 14. The crucible 66 is connected to the mold cavity 54 by a passageway 70. A small metal disk 76 may be inserted into the base of the crucible prior to filling with metal oxides.

A spark or ignition gun (not shown) will be brought in proximity near the counter sunk funnel top 28 of the circular opening 14. A spark will ignite the starting material. This will cause the starting material 68 in the crucible 66 to be ignited which will cause the metal oxide 64 in the crucible to be reduced. As the metal oxide turns into molten material, the metal disk 76 will be melted causing the molten material to flow through the passageway 70 and into the mold cavity 54 forming a good electrical connector between the conductor rod 42 and the stranded cable 44.

As the exothermic reaction takes place, gases and sparks will move upward through the elongated opening 18 of the lower or bottom face 16. Because the space 22 and vent 24 through the side face 26 are larger than the small circular opening 14 in the top, most of the gases and sparks will be vented to the side as opposed to being vented through the top 12.

The lid 10 may move between a closed position and an opened position (not shown) through use of a hinge 74 attached to both the mold device 40 and the lid 10. In a preferred embodiment, the hinge 74 is opposed to the vent through the side face 26. Alternately, the vent will be in a side face such as face 21 or 23 adjacent the hinge 74 (not shown).

In an alternate embodiment, the lower face 16 may be enlarged or even removed without interfering with the teachings of the present invention.

Whereas, the present invention has been described in relation to the drawings attached hereto, it should be understood that other and further modifications, apart from those shown or suggested herein, may be made within the spirit and scope of this invention.

What is claimed is:

1. A lid for an exothermic reaction mold device having a crucible in a block with an open top, which lid comprises:

a lower face wherein said lower face completely covers said open top of said block with the exception of an elongated opening slot therethrough;

an upper face with a circular opening therethrough, whereby an axis of said circular opening passes through said elongated opening slot; and a space between said upper face and said lower face wherein said space is vented through an exhaust vent between said upper and said lower face, said exhaust vent having a cross-section in the form of a slot perpendicular to said opening slot and in communication therewith.

2. A lid for an exothermic reaction mold device as set forth in claim 1 wherein said lower face is opposed and parallel to said upper face.

3. A lid for an exothermic reaction mold device as set forth in claim 1 wherein said lid is hinged to said block.

4. A lid for an exothermic reaction mold device as set forth in claim 3 including a hinge opposed to said vent from said lid.

5. A lid for an exothermic reaction mold device as set forth in claim 1 wherein said exhaust vent is perpendicular to said axis of said circular opening.

6. A lid for an exothermic reaction mold device as set forth in claim 1 wherein said lid is composed of graphite.

7. A lid for an exothermic reaction mold device as set forth in claim 1 wherein said circular opening has a counter sunk funnel top.

8. A lid for an exothermic reaction mold device as set forth in claim 1 wherein said elongated opening slot is elliptical.

9. A lid for an exothermic reaction mold device as set forth in claim 1 wherein said crucible is connected to a mold cavity in said block by a passageway.

10. A lid for an exothermic reaction mold device as set forth in claim 1 wherein lid is movable between an open and closed position.

11. A lid for an exothermic reaction mold device having a crucible in a block with an open top, which lid comprises:
- a top face;
- a bottom face, wherein said bottom face completely covers said open top of said block when in a closed position;
- at least one side face extending between said top and said bottom face; and
- an exhaust pocket recessed from said at least one side face into said lid between said top face and said bottom face wherein a circular opening through said top face is in communication with said pocket and an elongated opening through said bottom face is in communication with said pocket so that said pocket forms an exhaust vent.

12. A lid for an exothermic reaction mold device as set forth in claim 11 wherein said lid is hinged to said block.

13. A lid for an exothermic reaction mold device as set forth in claim 11 wherein said lid is composed of graphite.

14. A lid for an exothermic reaction mold device as set forth in claim 11 wherein said circular opening has a counter sunk funnel top.

* * * * *